April 21, 1936.    M. M. CUNNINGHAM ET AL    2,038,207
BRAKE
Filed Nov. 18, 1932    3 Sheets-Sheet 1
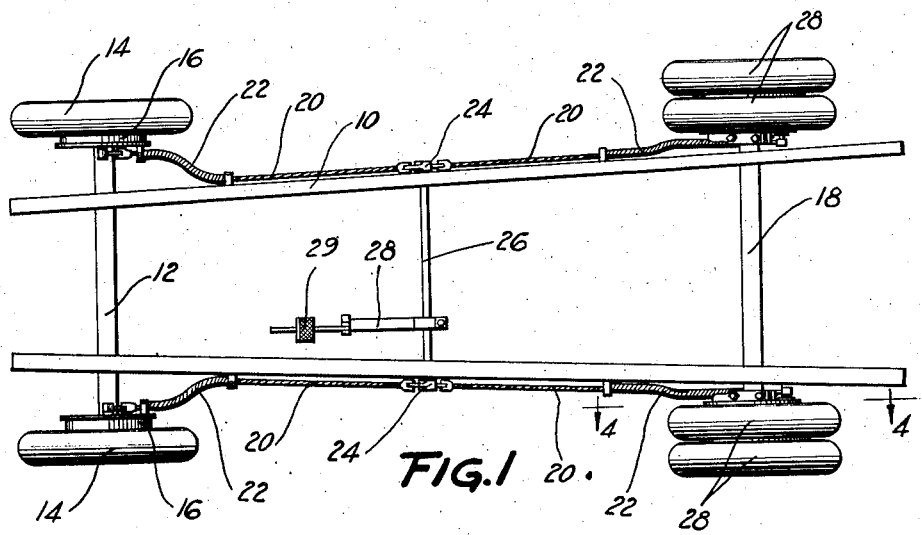
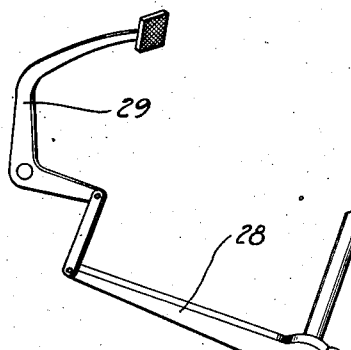
FIG.2
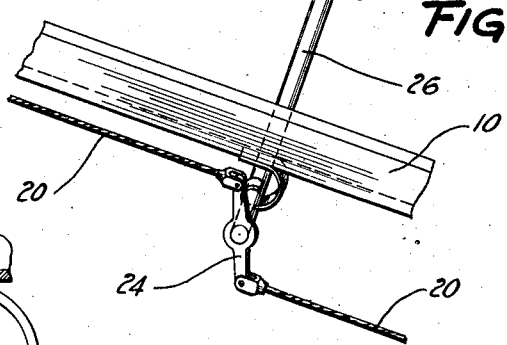
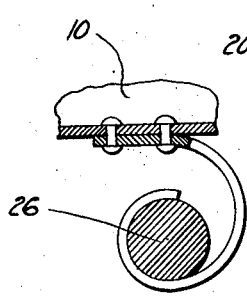
FIG.3
INVENTOR.
MARION M. CUNNINGHAM
EDWARD H. BERNO
BY
ATTORNEYS.

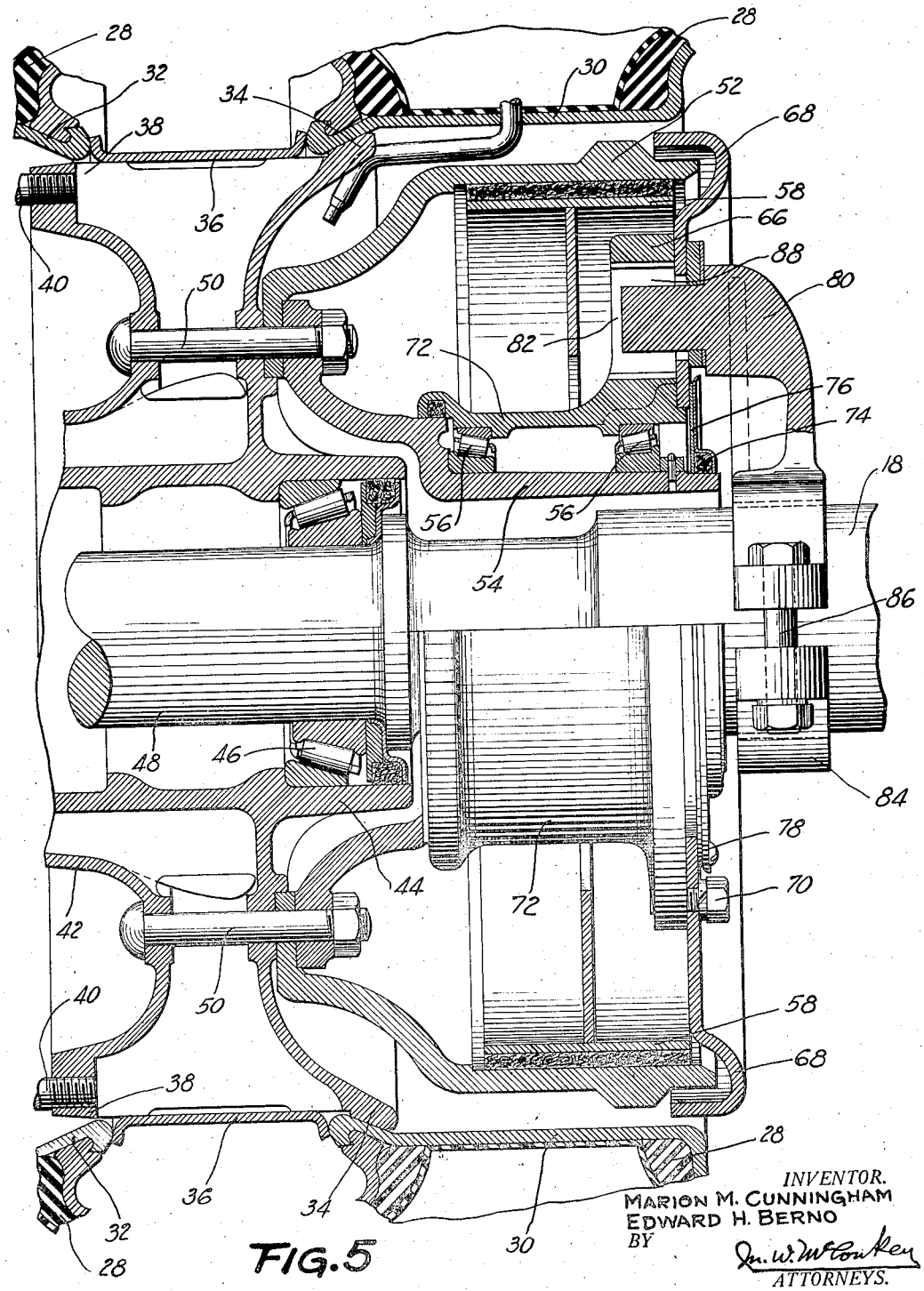

Patented Apr. 21, 1936

2,038,207

UNITED STATES PATENT OFFICE 2,038,207

BRAKE

Marion M. Cunningham and Edward H. Berno, South Bend, Ind., assignors to Bendix Aviation Corporation, South Bend, Ind., a corporation of Delaware Application November 18, 1932, Serial No. 643,263

1 Claim. (Cl. 188—78)

This invention relates to brakes, and is illustrated as embodied in a system of four-wheel automobile brakes. An object of the invention is to provide a novel wheel and brake assembly, attachable to and detachable from a vehicle as a unit, the wheel preferably rotatably supporting the brake in such a manner that, when mounted on the vehicle a part, shown mounted on the axle, engages the brake and prevents it from turning, without interfering with the rotation of the wheel.

This is especially useful for six-wheel trucks, trailers, and other vehicles having dead axles, but is also adaptable for use on vehicles generally.

In one desirable arrangement, the wheel, which is provided with a brake drum, has a central hub sleeve which may be secured to the wheel if desired by the same bolts as the drum, and which rotatably supports the brake assembly arranged in the drum. A stationary part or torque arm, preferably mounted on the axle, engages an opening in the backing plate or other part of the brake, to hold it from turning.

The above and other objects and features of the invention, including various novel combinations of parts and desirable particular arrangements, will be apparent from the following description of one illustrative embodiment shown in the accompanying drawings, in which:

Figure 1 is a diagrammatic top plan view of a chassis embodying our invention;

Figure 2 is a detail perspective view, on a larger scale, showing the mounting of one end of the brake cross-shaft;

Figure 3 is a partial vertical section showing one end of the shaft;

Figure 5 is a partial vertical section through the novel wheel and brake assembly, on the line 5—5 of Figure 4.

Figure 4:
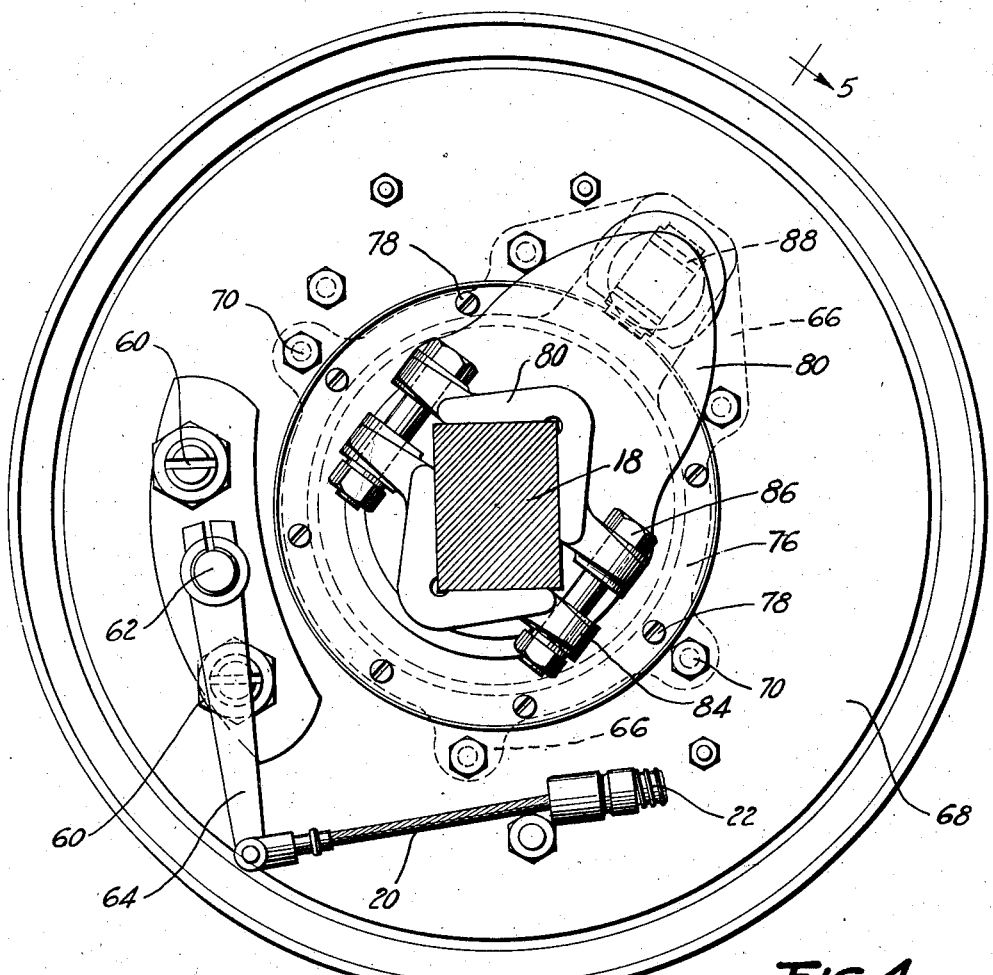
Figure 4 is a section on the line 4—4 of Figure 1, showing the novel wheel and brake assembly (with the tire omitted) in inside elevation.

The illustrated chassis includes a frame 10 supported, by the usual vehicle springs (not shown), on a front axle 12 having swiveled wheels 14 provided with brakes 16, and on any suitable rear axle 18 having wheels and brakes further described below. The brakes are actuated by means such as four steel cables 20 having the sections adjacent the wheels housed in flexible "Bowden" conduits 22 each of which is secured at one end to the backing plate of its brake and at its other end to the chassis frame.

The four cables 20 are actuated, to apply the brakes, by levers or arms 24, secured on a crossshaft 26 shown provided with a rigid horizontal actuating lever 28 linked to a service brake pedal 29. To provide a mounting for the shaft which does not require lubrication, and which at the same time allows it to shift slightly to balance the pressures on the four brakes, its opposite ends are preferably supported by C-shaped leaf springs, which flex to permit the shaft to turn, and which yieldingly hold the ends of the shaft against the lower sides of the side members of the frame 10.

The rear wheels are shown as being of the dual type, having each two tires 28 demountably carried on rims 30 and 32, the former urged onto a conical seat on a flange 34 by a spacer ring 36 acted on by rim 32, and the latter seated on a cylindrical seat 38 and held in place in the usual manner by suitable clamps (not shown) actuated by nuts (not shown) on the ends of bolts or studs 40.

The flanges 34 and 38 are shown formed integrally on the periphery of a cast spoked wheel 42 having a central hub 44 journaled on tapered roller bearings 46 on a spindle 48 provided on the end of the axle 18. Only the inner bearing 46 is shown, as this is a conventional mounting for a wheel and does not in itself form part of our invention.

Wheel 42 has rigidly and coaxially secured thereto, by a series of bolts 50 or the like, a rotatable brake drum 52 underlying the rim 30, the bolts 50 preferably also serving for the coaxial attachment to the wheel and drum of a central hub sleeve 54.

According to an important feature of our invention, the hub sleeve 54 or its equivalent is formed, as by having a suitable shoulder beyond which is a cylindrical seat, to receive tapered roller or other bearings 56 rotatably supporting the brake proper, which thus is mounted with the wheel in a unit structure.

The illustrated brake includes connected shoes 58, one or the other of which engages one of the anchors 60 when the brake is actuated by a floating cam or the like (not shown) operated by a cam-shaft 62 provided with a lever 64 connected to the corresponding cable 20. This type of arrangement of the shoes and their anchorage and the applying cam is well known, and accordingly need not be described in detail.

We prefer to arrange the anchors 60 and camshaft 62 on a rotatable carrier or spider 66, having a light dust-shield 68 secured thereto by suitable fastenings 70 and which serves to close the open side of the drum 52. The carrier 66 has a central tubular extension or supporting hub 72 which is journaled on the above-described bearings 56. The space between the inner ends of hubs 54 and 72 may be sealed by means such as a felt washer 74 encircling hub 54 and carried by stamped washers 76 secured by fastenings 78 to the hub 72. Thus the entire brake is rotatably mounted on the hub 54.

The braking torque is taken, and the brake held from turning, by means such as an arm 80 rigidly mounted on the axle 18 and having a projecting end seated in a close-fitting opening 82 in the carrier or spider 66. Arm 80 is shown with an angular base engaging the axle, and as provided with an angle-shaped clamp or cap 84 held by clamp bolts 86, the base and cap non-rotatably embracing the axle between them. The end of arm 80 may be squared to receive a thrust block 88 shaped to be seated in the opening 82.

While one illustrative embodiment has been described in detail, it is not our intention to limit the scope of the invention to that particular embodiment, or otherwise than by the terms of the appended claim.

We claim:

A wheel having a wheel body with an integral hub, a fixed axle projecting through the hub and on which the wheel is rotatably mounted, a sleeve spaced from and concentrically surrounding the axle for a part of its length, a brake drum, said sleeve and said brake drum being mounted upon the wheel body by common fastenings, a brake arranged in said drum having a sleeve rotatably mounted on said first named sleeve, brake supporting means attached to said last named sleeve, and a member fixed upon the axle and having an arm adapted to project into an opening in said brake supporting means whereby the brake is prevented from turning with the wheel.

MARION M. CUNNINGHAM.
EDWARD H. BERNO.